(12) United States Patent
Georgeson et al.

(10) Patent No.: US 8,198,617 B2
(45) Date of Patent: *Jun. 12, 2012

(54) LOCATING A COMPONENT UNDERNEATH A SURFACE OF A TARGET OBJECT AND LOCATING AN ACCESS PANEL FOR ACCESSING THE COMPONENT

(75) Inventors: Gary E. Georgeson, Federal Way, WA (US); Gregory J. Sweers, Renton, WA (US); Nathan P. Renaud, Mountlake Terrace, WA (US); James J. Troy, Issaquah, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 772 days.

This patent is subject to a terminal disclaimer.

(21) Appl. No.: 12/335,202

(22) Filed: Dec. 15, 2008

(65) Prior Publication Data

US 2010/0153051 A1      Jun. 17, 2010

(51) Int. Cl.
*G01N 21/86* (2006.01)
(52) U.S. Cl. .................. 250/559.4; 250/559.29
(58) Field of Classification Search ............... 250/559.4, 250/559.29, 221; 356/141.2–141.4
See application file for complete search history.

(56) References Cited

U.S. PATENT DOCUMENTS

| 4,616,127 | A * | 10/1986 | Whiting .................. 235/412 |
| 7,859,655 | B2 * | 12/2010 | Troy et al. .............. 356/141.2 |

OTHER PUBLICATIONS

Web page featuring Leica Geosystems—Leica Absolute Tracker™ All-New Groundbreaking Laser Tracker Systems www.leica-geosystems.com (date of first publication unknown).
Web page featuring Leica Geosystems—Leica TPS1200+ The Total Station with the Plus www.leica-geosystems.com (date of first publication unknown).
Web page featuring Leica Geosystems—Leica DISTO™ A8 the visionary one—for in and outdoors www.leica-geosystems.com (date of first publication unknown).
Web page featuring Leica Geosystems—Leica RedLine—The World's most versatile Construction Site positioning range www.leica-geosystems.com (date of first publication unknown).
Web page featuring Leica Geosystems—Leica Builder T100/T200; R100/R200; R100M/R200M www.leica-geosystems.com (date of first publication unknown).
Web page featuring Leica Geosystems—Leica Dimensional Control Program—Application Software DCP www.leica-geosystems.com (date of first publication unknown).

(Continued)

*Primary Examiner* — Que T Le
(74) *Attorney, Agent, or Firm* — Kathryn A. Soucy (57) ABSTRACT

A first method locates a component positioned underneath a surface of a target object using a pointing instrument, wherein a position of the component in the target object coordinate system is known. The first method includes calculating an orientation of the aim point axis of the instrument in the instrument coordinate system for the aim point axis of the instrument to be aligned with the component using at least an inverse calibration matrix, the position of the component in the target object coordinate system, and inverse kinematics of the instrument. The first method also includes rotating the aim point axis of the instrument to the calculated orientation. Second and third methods also are described for locating an access panel for accessing the component and/or maintenance zones in which the component resides.

20 Claims, 9 Drawing Sheets

OTHER PUBLICATIONS

Web page featuring ViconBlade, Vicon Motion Systems www.vicon.com (date of first publication unknown).
Web page featuring MotionAnalysis—The Industry Leader for 3D Passive Optical Motion Capture—Raptor-4 Digital RealTime System www.MotionAnalysis.com (date of first publication unknown).
Web page featuring ProCollector and ProCommander—a dynamic duo of laser power. www.SL-LASER.com (date of first publication unknown).
Web page featuring ProDirector XS—When Size Matters http://www.laserprojection.com/na/m_ProDirector4.htm (date of first publication unknown).
Laser Projection Technologies, Inc. LPT1; LPT 10; LPT 100 Laser Radar Project http://www.lptcorp.com/ (date of first publication unknown).

* cited by examiner

LOCATING A COMPONENT UNDERNEATH A SURFACE OF A TARGET OBJECT AND LOCATING AN ACCESS PANEL FOR ACCESSING THE COMPONENT

CROSS REFERENCE TO RELATED APPLICATIONS

The present application is related to U.S. patent application Ser. No. 12/235,161 filed Sep. 22, 2008.

FIELD

The present invention relates generally to locating items within a structure, and more particularly to a method for locating a component underneath a surface of a target object and to a method for locating an access panel for accessing the component.

BACKGROUND

Existing methods for locating a component underneath a surface of an airplane for maintenance/repair of the airplane include maintenance/repair technicians spending significant time to visually determine the component location and the closest access panel through mental correlation between a known maintenance zone containing the component and drawing locator illustrations which include the component. In one example, the component is a wire/connector which is used by the maintenance/repair technicians to test another component, such as an actuator, which is electrically connected to the wire/connector.

What is needed is an improved method for locating a component underneath a surface of a target object and an improved method for locating and identifying the access panel which is closest or most appropriate for accessing the component. Also needed is the correlation of given component three point locations to predefined maintenance zones and access panels.

SUMMARY

A first method is for locating a component positioned underneath a surface of a target object having a target object coordinate system using a pointing instrument having an aim point axis and having an instrument coordinate system, wherein position coordinates of the component in the target object coordinate system are known. The first method includes calculating an inverse calibration matrix which transforms a position defined in the target object coordinate system to a position defined in the instrument coordinate system. The first method also includes calculating an orientation of the aim point axis of the instrument in the instrument coordinate system for the aim point axis of the instrument to be aligned with the component using at least the inverse calibration matrix, the position of the component in the target object coordinate system, and inverse kinematics of the instrument. The first method also includes rotating the aim point axis of the instrument to the calculated orientation.

A second method is for locating one of a plurality of access panels for accessing a component positioned underneath a surface of a target object having a target object coordinate system using a pointing instrument having an aim point axis and having an instrument coordinate system, wherein position coordinates of the component and the access panels defined in the target object coordinate system are known, and wherein the access panels define portions of the surface. The second method includes determining a closest access panel to the component using at least the known positions of the component and the access panels in the target object coordinate system. The second method also includes calculating an inverse calibration matrix which transforms a position defined in the target object coordinate system to a position defined in the instrument coordinate system. The second method also includes calculating an orientation of the aim point axis of the instrument in the instrument coordinate system for the aim point axis of the instrument to be aligned with the closest access panel to the component using at least the inverse calibration matrix, the position of the closest access panel to the component in the target object coordinate system, and inverse kinematics of the instrument. The second method also includes rotating the aim point axis of the instrument to the calculated orientation. The second method also includes the identification of the maintenance zone in which the known component resides wherein positions of the component and the maintenance zones in the target object coordinate system are known, and wherein the maintenance zones define portions of the volume.

A third method is for locating one of a plurality of access panels for accessing a component located underneath a surface of a target object having a target object coordinate system using a pointing instrument having an aim point axis and having an instrument coordinate system, wherein the access panels define portions of the surface, wherein the target object includes a plurality of separate maintenance zones each having a volume boundary, wherein the component is located in one of the maintenance zones, and wherein positions of the component, the access panels, and the volume boundaries of the maintenance zones in the target object coordinate system are known. The third method includes identifying the maintenance zone in which the component is located using at least the known positions of the component and the volume boundaries of the maintenance zones in the target object coordinate system. The third method also includes determining within the identified maintenance zone the access panel which is closest to the component using at least the known positions of the component and each access panel in the identified maintenance zone in the target object coordinate system. The third method also includes calculating an inverse calibration matrix which transforms a position defined in the target object coordinate system to a position defined in the instrument coordinate system. The third method also includes calculating an orientation of the aim point axis of the instrument in the instrument coordinate system for the aim point axis of the instrument to be aligned with the determined access panel using at least the inverse calibration matrix, the position of the determined access panel in the target object coordinate system, and inverse kinematics of the instrument. The third method also includes rotating the aim point axis of the instrument to the calculated orientation.

Several benefits and advantages are derived from one or more of the methods. In one example, using the pointing instrument, such as a laser wherein the aim point axis is a laser beam of the laser, allows for a faster and more accurate method for locating, for maintenance/repair purposes, a component positioned underneath a surface of a target object, such as an airplane, and/or allows for a faster and more accurate method for locating, for maintenance/repair purposes, an access panel for accessing the component and a maintenance zone in which the component resides.

DESCRIPTION

Figure 1:
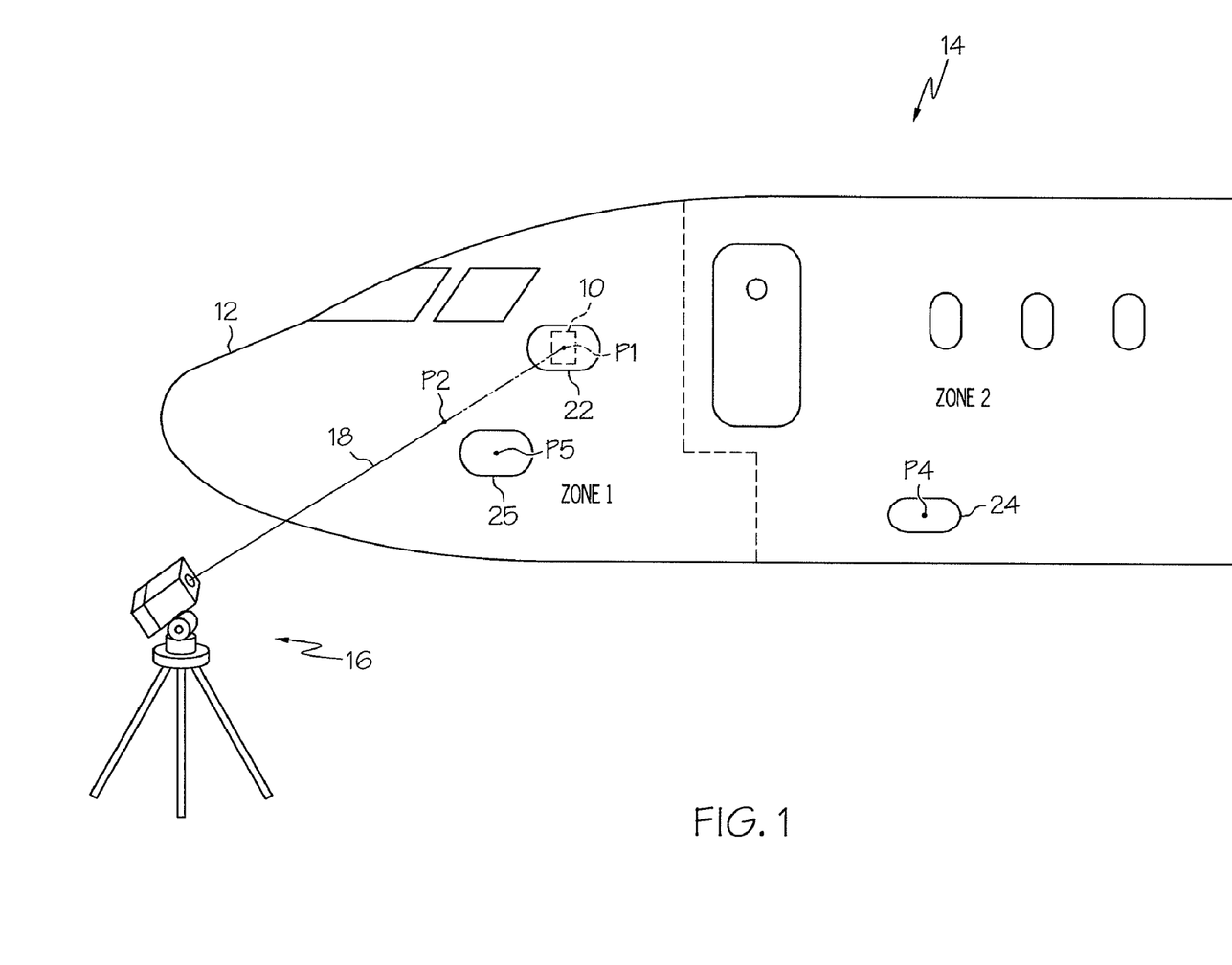
FIG. 1 is a diagrammatic side view of an illustrative embodiment of an airplane and a pointing instrument, wherein the aim point axis of the pointing instrument is a laser beam which intersects the surface of the airplane at point P2, wherein the aim point axis has been extended (as a projected line) beneath the surface of the airplane terminating at point P1 on the component (shown as a hidden line) which is located beneath the surface of the airplane, and wherein the airplane is shown with two maintenance zones (with a dashed line showing the boundary between them), and three access panels including an access panel which is closest or provides the most appropriate access to the component and which is shown superimposed over the component in this side view.
Figure 2:
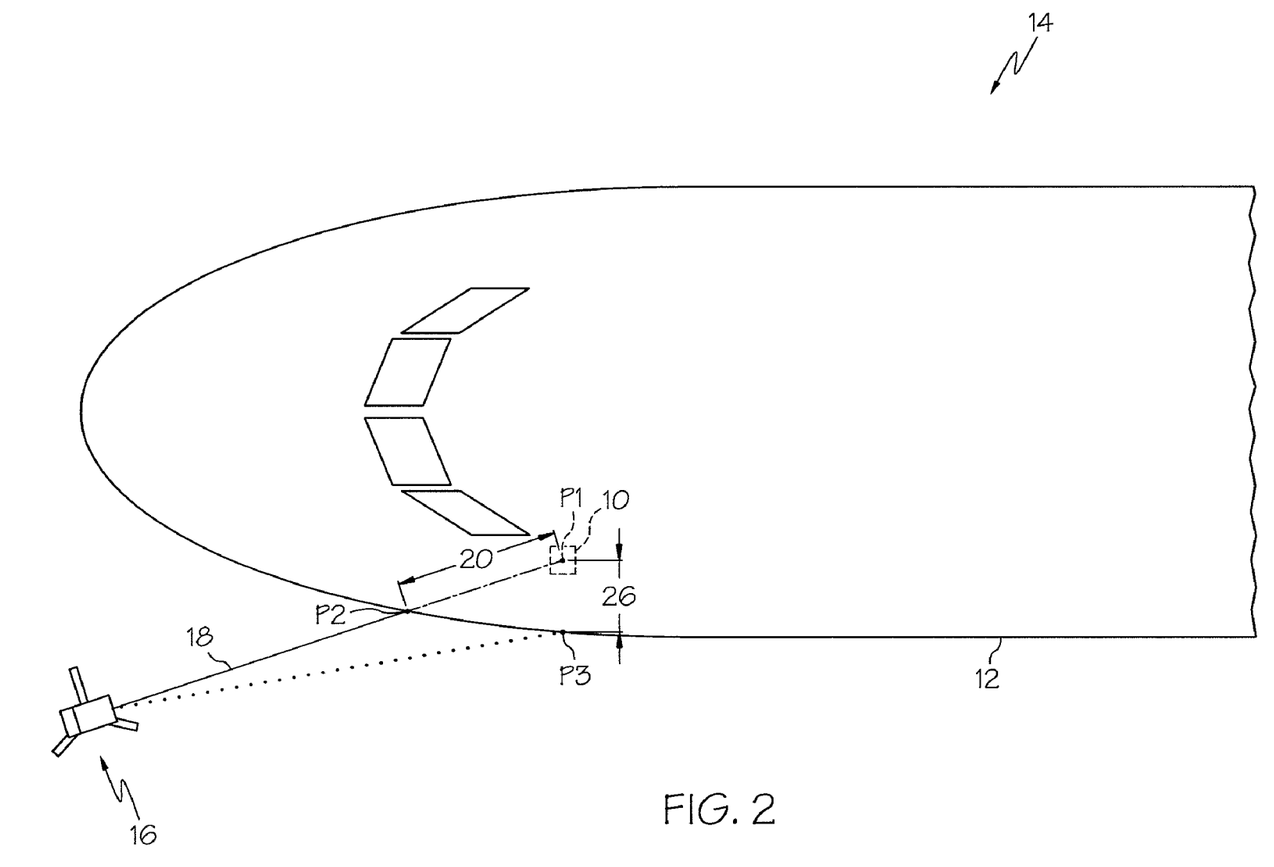
FIG. 2 is a diagrammatic top view of the illustrative embodiment of the airplane and the pointing instrument of FIG. 1, wherein the solid line from the instrument to point P2 on the surface of the airplane represents the aim point axis of the instrument being aligned with point P1 of the component located underneath the surface of the airplane, and wherein the dotted line from the instrument to the airplane represents the aim point axis of the instrument being aligned with point P3 on the closest access panel to the component.
Figure 3:
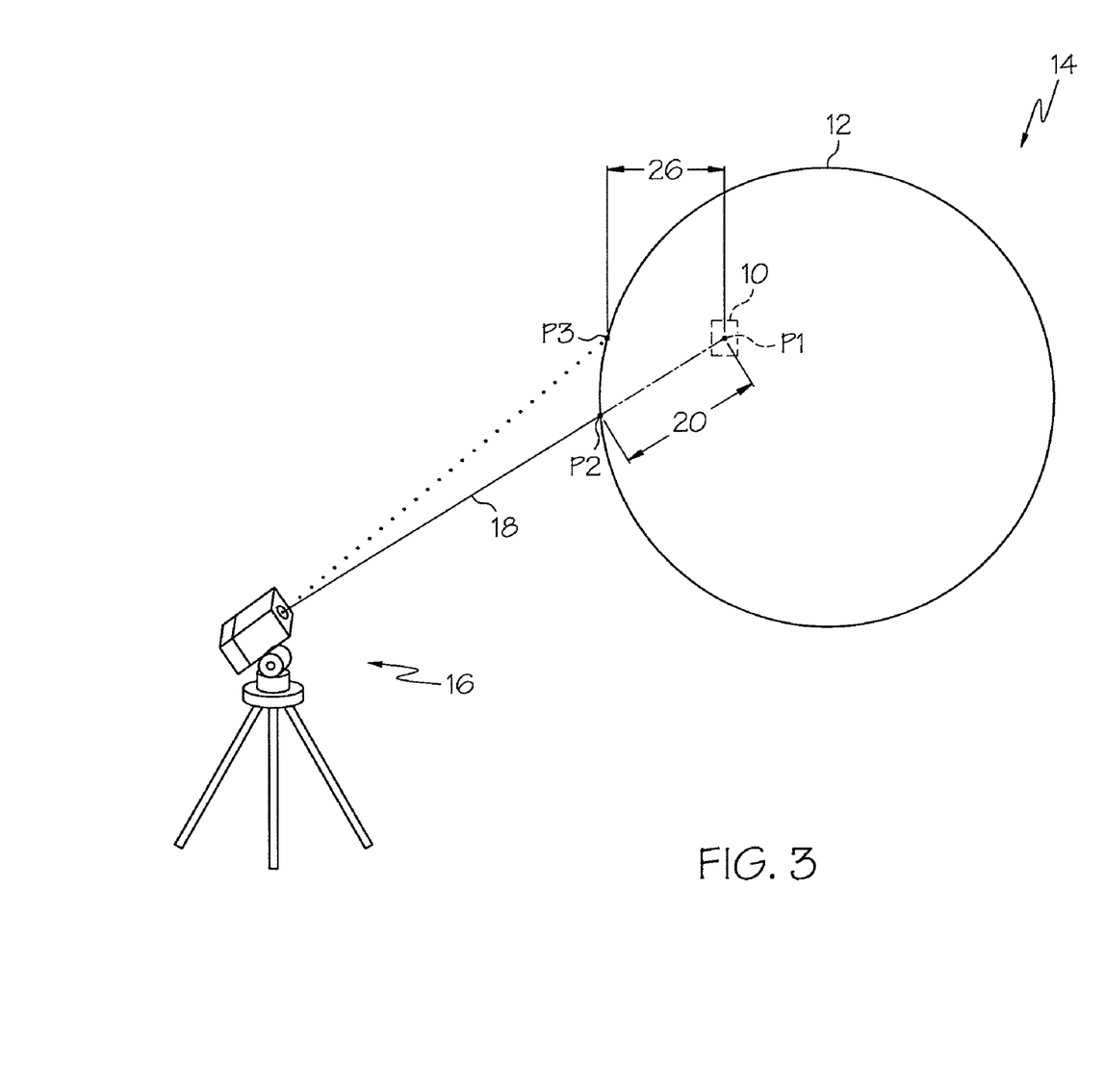
FIG. 3 is a diagrammatic end view of the illustrative embodiment of the airplane and the pointing instrument of FIG. 1, wherein the solid line from the instrument to point P2 on the surface of the airplane represents the aim point axis of the instrument being aligned with point P1 of the component located underneath the surface of the airplane, and wherein the dotted line from the instrument to the airplane represents the aim point axis of the instrument being aligned with the point P3 on the closest access panel to the component.

With reference to the illustrative embodiment of FIGS. 1-3, a first method is for locating a component 10 located underneath a surface 12 of a target object 14 having a target object coordinate system (such as 15 of FIG. 4) using a pointing instrument 16 having an aim point axis 18 and having an instrument coordinate system (such as 19 of FIG. 4), wherein a position of the component 10 in the target object coordinate system is known. The first method includes calculating an inverse calibration matrix which transforms a position defined in the target object coordinate system to a position defined in the instrument coordinate system. The first method also includes calculating an orientation of the aim point axis 18 of the instrument 16 in the instrument coordinate system for the aim point axis 18 of the instrument 16 to be aligned with the component 10 using at least the inverse calibration matrix, the position of the component 10 in the target object coordinate system, and inverse kinematics of the instrument 16. The first method also includes rotating the aim point axis 18 of the instrument 16 to the calculated orientation.

It is noted that a position of the component 10 is a position of a point (such as point P1) of the component 10, and that in an extension of the first method, additional orientations of the aim point axis 18 of the instrument 16 in the instrument coordinate system are also calculated for the aim point axis 18 of the instrument 16 to be aligned with additional points of the component 10, wherein the aim point axis 18 of the instrument 16 is also rotated to these additional calculated orientations.

In a first arrangement of the first method, the instrument 16 includes a laser, and the aim point axis 18 is a laser beam of the laser. In one variation, the first method also includes activating the laser beam when the aim point axis 18 of the instrument 16 has been rotated to the calculated orientation. In the same or a different variation, the first method also includes using the laser beam to at least one of trace a contour and trace a fill-in area of the component 10 on the surface 12 when the aim point axis 18 of the instrument 16 is rotated to corresponding aligned points of the component 10 underneath the surface 12. In other arrangements, the instrument includes a video camera and/or a telescope.

In one example of the first arrangement, the target object 14 is an airplane as shown in FIGS. 1-3, and the known position of the component 10 in the target object coordinate system is obtained from a CAD definition of the component 10. In one variation, the instrument 16 is located exterior to the airplane, and the surface 12 is an exterior surface of the airplane. In a different variation, the instrument is located interior of the airplane, and the surface is an interior surface of the airplane.

In one embellishment, the first method also includes determining a depth distance 20 of the component 10 from the surface 12 substantially along the aim point axis 18 when the aim point axis 18 of the instrument 16 has been rotated to the calculated orientation, and displaying the depth distance 20. In one technique, the distance of the component 10 from the instrument 16 is calculated from the position of the component 10 defined in the instrument coordinate system and from a laser-range-finder distance from the instrument 16 to a point P2 on the surface 12 when the aim point axis 18 is aligned with the component 10, wherein a subtraction yields the depth distance 20. In another technique, the distance from the instrument 16 to a point P2 on the surface 12 when the aim point axis 18 is aligned with the component 10 is determined from the intersection point of the aim point axis 18 with a model of the surface 12.

With reference to the illustrative embodiment of FIGS. 1-3, a second method is for locating one of a plurality of access panels 22, 24, and 25 (only three of the potential access panels are shown in FIG. 1) for accessing a component 10 positioned underneath a surface 12 of a target object 14 having a target object coordinate system (such as 15 of FIG. 4) using a pointing instrument 16 having an aim point axis 18 and having an instrument coordinate system (such as 19 of FIG. 4), wherein positions of the component 10 and the access panels 22, 24, and 25 in the target object coordinate system are known, and wherein the access panels 22, 24, and 25 define portions of the surface 12. The second method includes determining (i.e., identifying) the closest or most appropriate access panel 22 to the component 10 using at least the known positions of the component 10 and the access panels 22, 24, and 25 in the target object coordinate system. Potential techniques for determining which panel is closest to the component 10 are shown in FIG. 9 and discussed in more detail later in this document. The second method also includes calculating an inverse calibration matrix which transforms a position defined in the target object coordinate system to a position defined in the instrument coordinate system. The second method also includes calculating the orientation of the aim point axis 18 of the instrument 16 in the instrument coordinate system for the aim point axis 18 of the instrument 16 to be aligned with the closest access panel 22 to the component 10 using at least the inverse calibration matrix, the position of the closest panel 22 to the component 10 in the target object coordinate system, and inverse kinematics of the instrument 16. The second method also includes rotating the aim point axis 18 of the instrument 16 to the calculated orientation.

It is noted that a position of an access panel 22, 24, and 25 is a position of a point (such as points P3, P4, and P5) on the access panel 22, 24, and 25, and that in an extension of the second method, additional orientations of the aim point axis 18 of the instrument 16 in the instrument coordinate system are also calculated for the aim point axis 18 of the instrument 16 to be aligned with additional points on the closest access panel 22 (such as the fasteners or the other fasteners of the closest access panel 22), wherein the aim point axis 18 of the instrument 16 is also rotated to these additional calculated orientations.

In one technique, the closest access panel 22 to the component 10 is identified by first determining the potential candidate access panels. This is step may use information about the maintenance zone in which the component is located to identify a subset of access panels from the entire list of access panels on the airplane. Once the subset of access panels is identified, locating techniques are used to determine which ones are the most appropriate access panels for the task (which might not be the "closest" panel). In the scenario illustrated in FIG. 1, the component 10 is located in maintenance zone 1, which contains candidate access panels 22 and 25. Access panel 24 (as well as others not in zone 1) has been eliminated from contention. In one simple locating technique the position vectors of points P1 (of the component 10), P3 (on access panel 22), and P5 (on access panel 25) in the target object coordinate system, wherein vector subtraction of the P1 and P3 vectors and of the P1 and P5 vectors yields subtraction vectors each having a length, and wherein the P3 or P5 associated access panel vector whose subtraction vector has the smallest length corresponds to the closest one of the P3 and P5 associated access panels 22 and 25. Other techniques may use information from the CAD model or assumptions about the design of the airplane (or other target vehicle) in order to make more appropriate access panel selections. Some of these alternatives are shown in the flow diagram of FIG. 8 and the vector diagrams of FIG. 9. Other techniques for calculating the closest access panel 22 to the component 10 are left to those skilled in the art.

In a first arrangement of the second method, the instrument 16 includes a laser, and the aim point axis 18 is a laser beam of the laser. In one variation, the second method also includes activating the laser beam when the aim point axis 18 of the instrument 16 has been rotated to the calculated orientation. In the same or a different variation, the second method also includes using the laser beam to at least one of trace a contour, trace a fill-in area, and highlight fasteners, of the closest access panel 22 to the component 10 on the surface 12 when the aim point axis 18 of the instrument 16 is rotated to corresponding points on the closest access panel 22 to the component 10. In other arrangements, the instrument includes a video camera and/or a telescope.

In one example of the first arrangement, the target object 14 is an airplane as shown in FIGS. 1-3, and the known positions of the component 10 and the access panels 22 and 24 in the target object coordinate system are obtained from CAD definitions of the component 10 and the access panels 22 and 24. In one variation, the instrument 16 is located exterior to the airplane, and the surface 12 is an exterior surface of the airplane. In a different variation, the instrument is located interior of the airplane, and the surface is an interior surface of the airplane.

In one application, a closest access panel 22 is created on the surface 12 of the target object 14 with respect to a component 10 most likely to be involved in maintenance/repair procedures such that a line can be drawn from the component 10 to a point P3 on the closest access panel 22, wherein the line is substantially perpendicular to the closest access panel 22 at the intersection point P3. In one embellishment, the second method also includes determining a substantially perpendicular depth distance 26 of the component 10 from the closest access panel 22 to the component 10, and displaying the depth distance 26. In one technique, the position vectors of points P1 and P3 in the target object coordinate system are determined, wherein vector subtraction yields a vector whose length is equal to the depth distance 26. Other techniques for calculating the depth distance 26 are left to those skilled in the art.

A third method is for locating one of a plurality of access panels 22, 24, and 25 (for illustrative purposes, only three panels are shown in FIG. 1) for accessing a component 10 located underneath a surface 12 of a target object 14 having a target object coordinate system (such as 15 of FIG. 4) using a pointing instrument 16 having an aim point axis 18 and having an instrument coordinate system (such as 19 of FIG. 4), wherein the access panels 22, 24, and 25 define portions of the surface 12, wherein the target object 14 includes a plurality of separate maintenance zones (not shown) each having a volume boundary, wherein the component 10 is located in one of the maintenance zones, and wherein positions of the component 10, the access panels 22, 24, and 25, and the volume boundaries of the maintenance zones in the target object coordinate system are known. The third method includes identifying the maintenance zone in which the component 10 is located using at least the known positions of the component 10 and the volume boundaries of the maintenance zones in the target object coordinate system. The third method also includes determining (i.e., identifying) within the identified maintenance zone the access panel which is the most appropriate panel for accessing component 10 using at least the known positions of the component 10 and each access panel 22 and 25 in the identified maintenance zone in the target object coordinate system. In this method, this determination may come from information associated with the component and retrieved from a component database, for example. The third method also includes calculating an inverse calibration matrix which transforms a position defined in the target object coordinate system to a position defined in the instrument coordinate system. The third method also includes calculating an orientation of the aim point axis 18 of the instrument 16 in the instrument coordinate system for the aim point axis 18 of the instrument 16 to be aligned with the determined access panel 22 using at least the inverse calibration matrix, the position of the determined access panel 22 in the target object coordinate system, and inverse kinematics of the instrument 16. The third method also includes rotating the aim point axis 18 of the instrument 16 to the calculated orientation.

It is noted that the arrangements, examples, etc. of the second method are equally applicable to the third method wherein "closest access panel" in the second method is replaced with "determined access panel" in the third method. It is noted that occasionally a closest access panel is in a neighboring maintenance zone and covers an obstruction (such as a rib) to accessing the component. In this situation, the access panel which is within the maintenance zone in which the component is located and which is determined to be the closest access panel in such maintenance zone to the component is the access panel which will provide access to the component. It is also noted that full access to a component (such as a large component) may require the removal of at least one additional access panel. In this case, the instrument would be directed to point the pointing device (e.g. laser) onto each panel or component that is required to be removed for each step of the process. In one example of the third method, the known positions of the volume boundaries of the maintenance zones in the target object coordinate system are obtained from CAD definitions of the volume boundaries of the maintenance zones.

In one enablement of one or more or all of the methods, the orientation of the aim point axis 18 of the instrument 16 in the instrument coordinate system includes a pan angle and a tilt angle (such as 28 and 30 of FIG. 4) of the aim point axis 18 of the instrument 16 in the instrument coordinate system 19, wherein the surface 12 of the target object 14 is three dimensional, and wherein the calibration matrix is a 4×4 homogeneous transformation matrix. In one example, not shown, a laptop computer is operatively connected to the instrument 16 and performs the steps of the methods including commanding pan and tilt actuators of the instrument 16 to rotate the aim point axis 18 of the instrument 16 to the calculated orientation.

Figure 4:
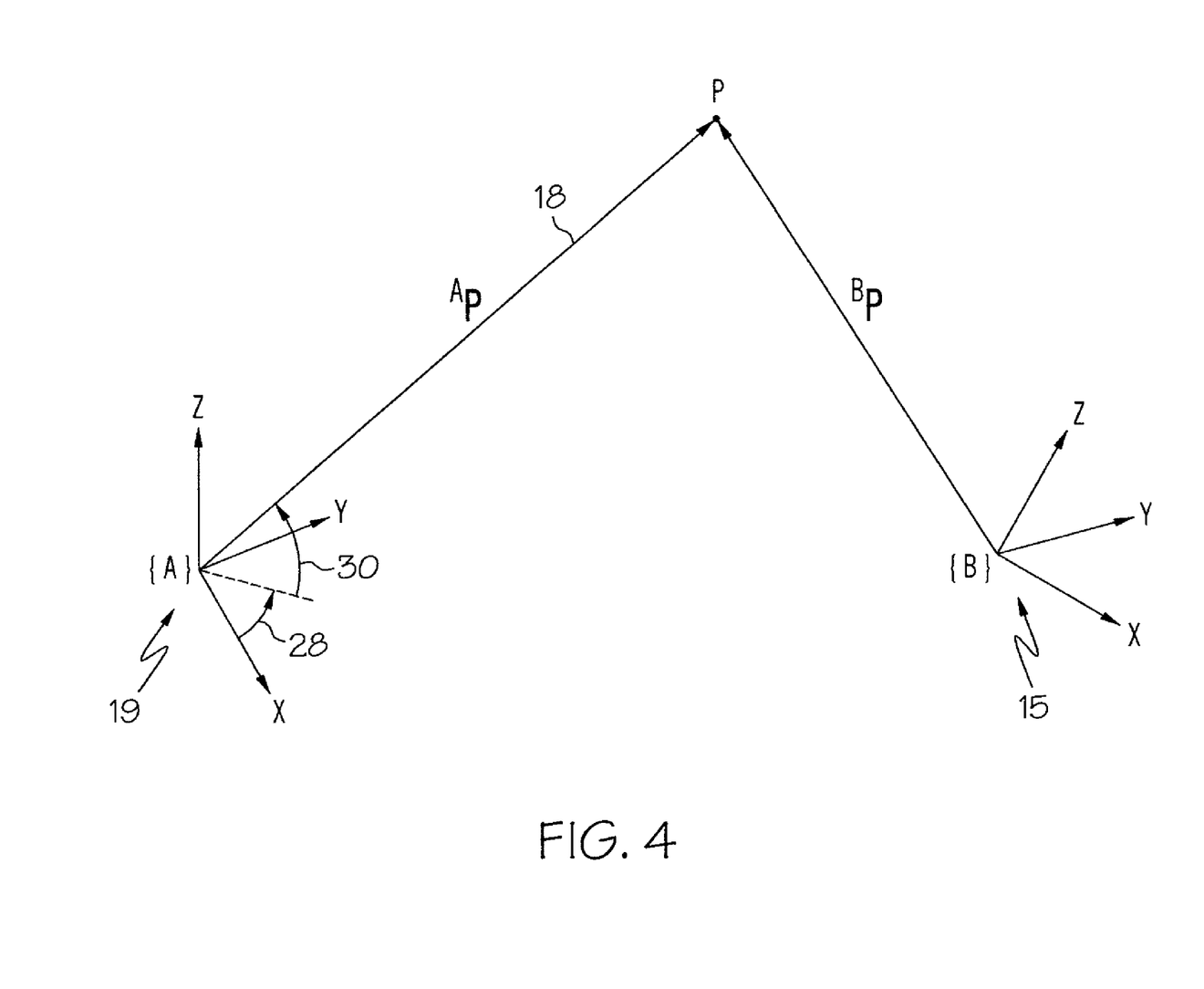
FIG. 4 is a diagram of an illustrative embodiment of an instrument coordinate system {A} and a target object coordinate system {B} showing a position vector $^{A}P$ extending from the origin of the instrument coordinate system substantially along the aim point axis of the instrument to a point of interest P and showing a position vector $^{B}P$ extending from the origin of the target object coordinate system to the point of interest P.

In one implementation of one or more or all of the methods, calculating the inverse calibration matrix includes three sub-steps. One sub-step includes measuring the orientation of the aim point axis 18 in the instrument coordinate system 19 when the aim point axis 18 of the instrument is in turn aligned with each of three calibration points (not shown) on the surface 12 of the target object 14, wherein positions of the three calibration points in the target object coordinate system 15 are known (such as from CAD definitions of the calibration points). Another sub-step includes measuring a distance (such as with a laser range finder) substantially along the aim point axis 18 from the instrument 16 to each of the three calibration points. Another sub-step includes calculating the inverse calibration matrix using at least the measured orientation and distance in the instrument coordinate system 19 corresponding to the three calibration points and the known positions of the three calibration points in the target object coordinate system 15.

In one example, the inverse calibration matrix and the orientation of the aim point axis 18 are calculated as follows.

Referring to FIG. 4, when the coordinates of a point P (such as a point of a component 10 underneath the surface 12 of the target object 14 or a point on an access panel 22, 24 and 25) in the instrument coordinate system 19 are spherical coordinates of pan (i.e., the pan angle 28 in FIG. 4 of a vector $^A$P to the point P), tilt (the tilt angle 30 in FIG. 4 of the vector $^A$P to the point P), and range (the distance along the vector $^A$P to the point P in FIG. 4), the position of the point P represented as spherical coordinates in the instrument coordinate system 19 is related to the position of the point P in X, Y, Z Cartesian coordinates in the instrument coordinate system 19 from the following equations for the forward kinematics of the instrument 16:

$X = \text{Range} * \cos(\text{pan}) * \cos(\text{tilt})$ $Y = \text{Range} * \sin(\text{pan}) * \cos(\text{tilt})$ $Z = \text{Range} * \sin(\text{tilt})$ where pan (azimuth) is rotation about the Z axis and tilt (elevation) is rotation about the Y axis in the instrument coordinate system 19.

It is noted that the position of the point P represented as Cartesian coordinates (X, Y, Z) in the instrument coordinate system 19 is related to the position of the point P represented as spherical coordinates (pan, tilt, range) in the instrument coordinate system 19 from the following equations for the inverse kinematics of the instrument 16:

$\text{pan} = \tan(Y, X)^{-1}$ $\text{tilt} = \tan(Z, \sqrt{X^2 + Y^2})^{-1}$ $\text{Range} = \sqrt{X^2 + Y^2 + Z^2}$ In one implementation, a position $^B$P (which is represented as a column vector in the form $[X, Y, Z, 1]^T$) in the target object coordinate system 15 is calculated from a position $^A$P (also a column vector in the form $[X, Y, Z, 1]^T$) in the instrument coordinate system 19 from the equation:

$^B P = {_A^B}T \, ^A P$ where T is the calibration matrix. In one example, the calibration matrix is a 4×4 homogeneous transformation matrix having the form:

$$_A^B T = \begin{bmatrix} r_{11} & r_{12} & r_{13} & X \\ r_{21} & r_{22} & r_{23} & Y \\ r_{31} & r_{32} & r_{33} & Z \\ 0 & 0 & 0 & 1 \end{bmatrix}$$

It is noted that a position $^A$P in the instrument coordinate system 19 can be calculated from a position $^B$P in the target object coordinate system 15 using the inverse of the calibration matrix from the equation:

$^A P = (_A^B T)^{-1}\, ^B P = {_B^A}T\, ^B P$

Figure 5:
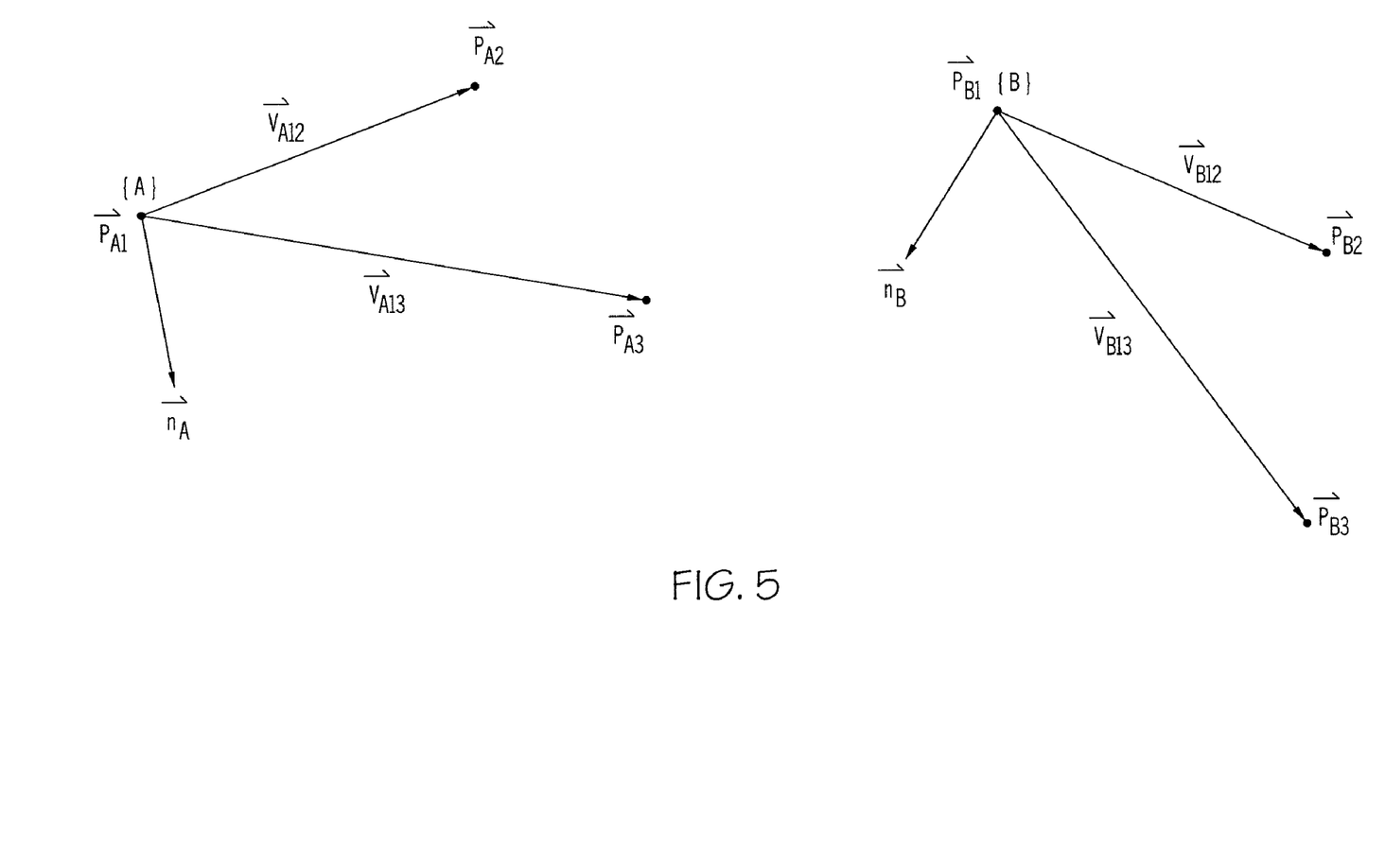
FIGS. 5-7 are explanatory diagrams helpful in understanding an illustrative method for calculating a calibration matrix for coordinate system transformation.
Figure 6:
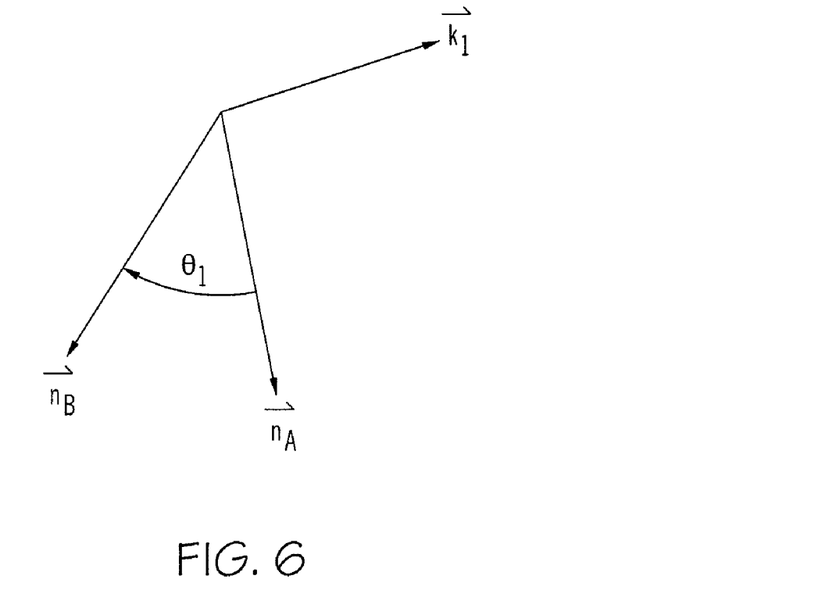
Figure 7:
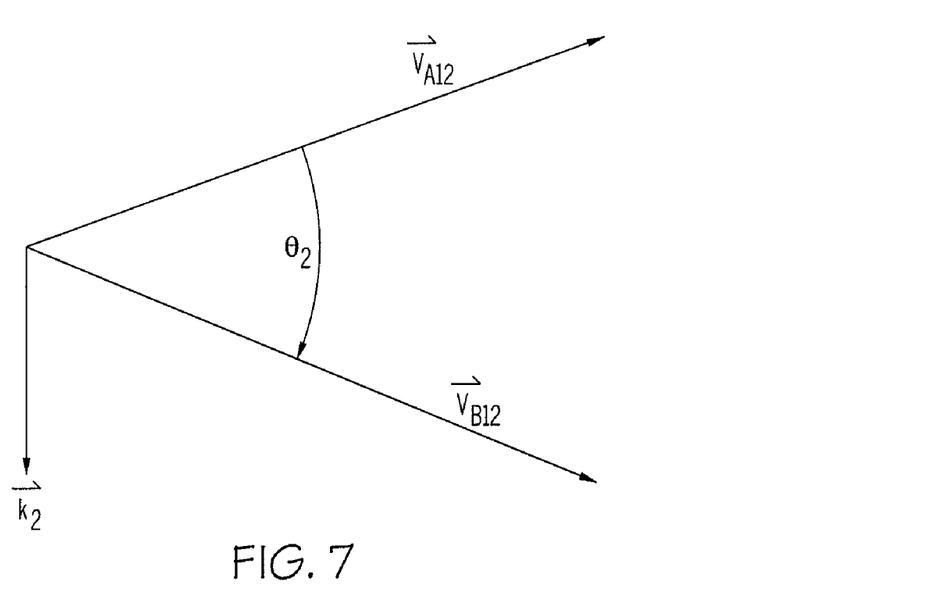

In one illustration, the three calibration points are non-colinear, and the calibration matrix is calculated as follows:

$\vec{n}_A = \vec{V}_{A12} \times \vec{V}_{A13}$ $\vec{n}_B = \vec{V}_{B12} \times \vec{V}_{B13}$ $\vec{k}_1 = \vec{n}_A \times \vec{n}_B$ $\theta_1 = a\cos(|\vec{n}_A| \cdot |\vec{n}_B|)$ $R_1 = f_1(|\vec{k}_1|, \theta_1)$ $\vec{k}_2 = \vec{V}_{A12} \times \vec{V}_{B12}$ $\theta_2 = a\cos(|\vec{V}_{A12}| \cdot |\vec{V}_{B12}|)$ $R_2 = f_1(|\vec{k}_2|, \theta_2)$ $R_{12} = R_1 R_2$ $_A^B T = [R_{12}, [R_1 \vec{V}_{B12} - \vec{V}_{A12}]^T]$ $_B^A T = (_A^B T)^{-1}$ wherein, referring to FIGS. 5-7:

$\vec{V}_{A12}$ is the vector in coordinate system A created from points $\vec{P}_{A1}$ and $\vec{P}_{A2}$ (i.e., $\vec{V}_{A12} = \vec{P}_{A2} - \vec{P}_{A1}$);

vectors $\vec{V}_{A13}$, $\vec{V}_{B12}$, $\vec{V}_{B13}$ follow the same format;

$\vec{n}_A$ and $\vec{n}_B$ are the normals created from the vector cross products;

$\vec{k}_1$ and $\vec{k}_2$ are axes of rotation;

$\theta_1$ and $\theta_2$ are rotation angles about axes $\vec{k}_1$ and $\vec{k}_2$, respectively;

$R_1$, $R_2$, and $R_{12}$ are 3×3 symmetric rotation matrices; and $f_1(\ )$ is the function (known to those skilled in the art and described, for example, in "Introduction to Robotics: Mechanics and Control", 3rd edition, by John J. Craig and published July 2004 by Prentice Hall Professional Technical Reference) which generates a 3×3 rotation matrix from the angle-axis definition described below:

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

where $c\theta = \cos(\theta)$, $s\theta = \sin(\theta)$, $v\theta = 1 - \cos(\theta)$, and $\hat{k} = [k_x, k_y, k_z]$.

Note that the 4×4 homogeneous calibration matrix $_A^B T$ only needs to be computed once for any position of the pointing instrument 16 relative to the target object 14, and $_A^B T$ can then be used to convert any number of vectors from coordinate system A (the instrument coordinate system 19) into coordinate system B (the target object coordinate system 15). It is also noted that the inverse calibration matrix $_B^A T$ can be calculated by calculating the inverse of the calibration matrix $_A^B T$ or can be calculated directly by switching the order of the vectors in the first equations of the previous paragraph.

In another example, the calibration matrix is calculated in a different manner, such as by using a 5-point or a 7-point image-based method.

Figure 8A:
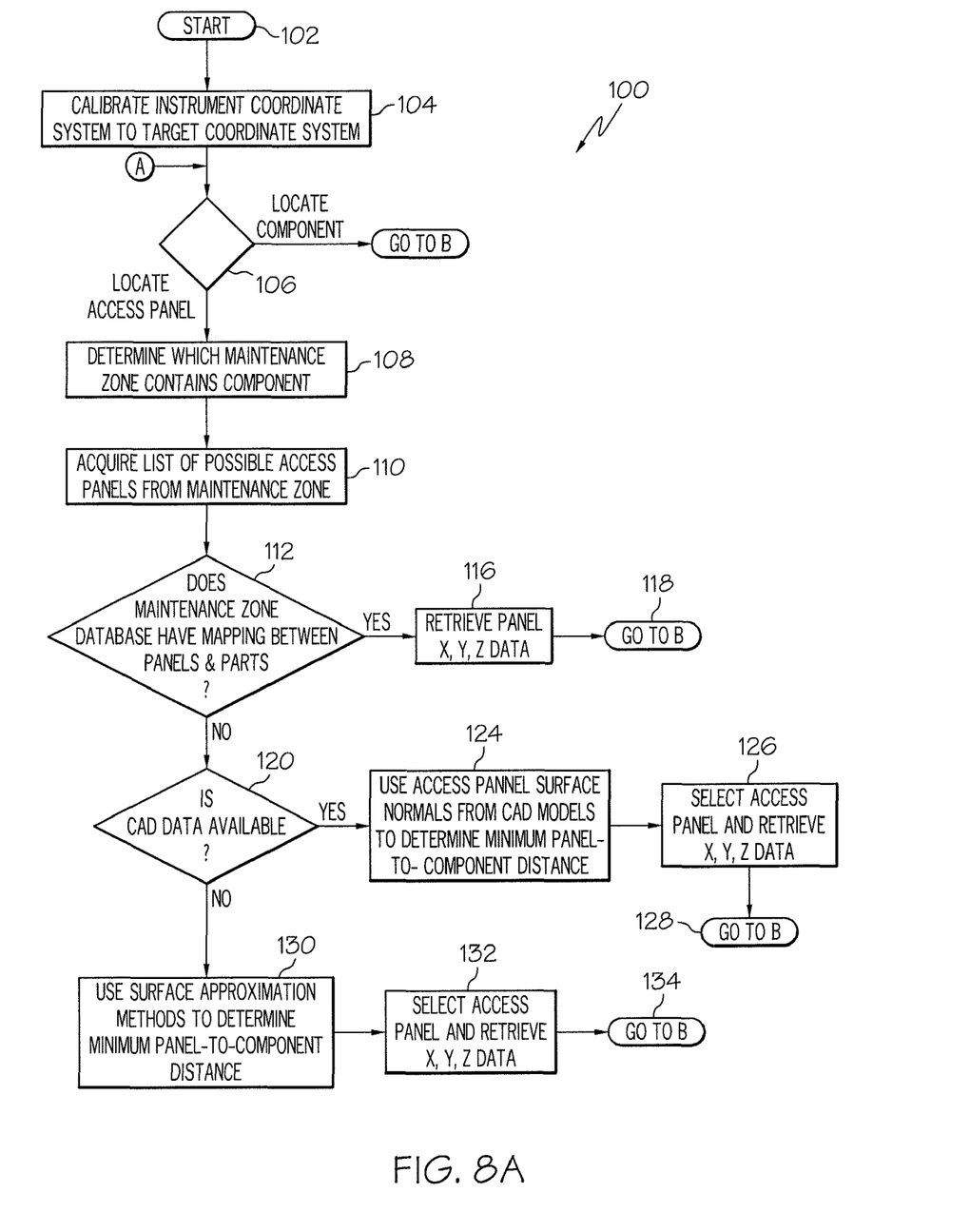
FIGS. 8A and 8B illustrate a flow chart of an exemplary method for locating a component underneath a surface of a target object and locating an access panel for access to the component.
Figure 8B:
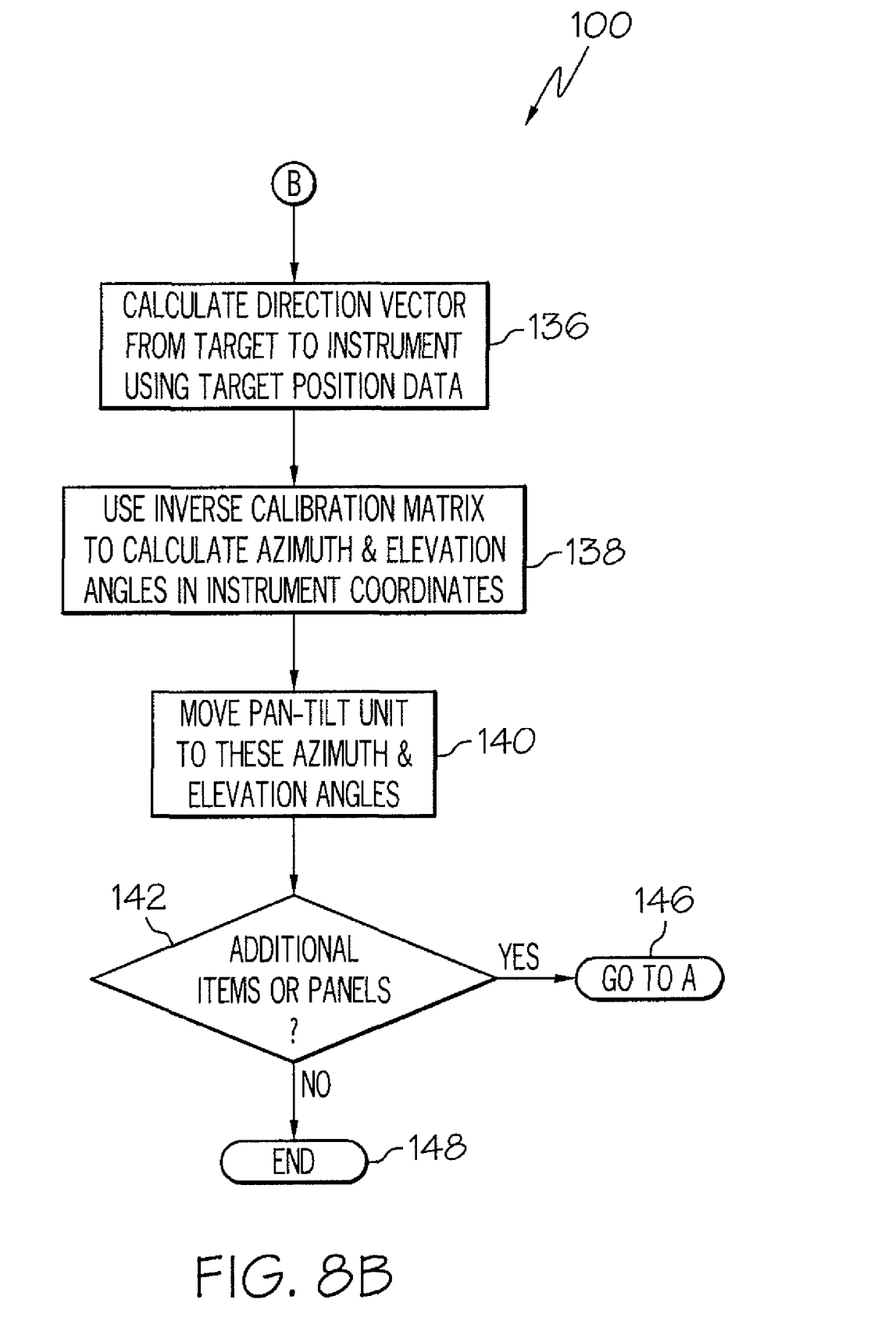

As shown in FIGS. 8A and 8B, one exemplary method, generally designated 100, for locating a component 10 underneath a surface 12 of a target object 14 and/or locating an access panel 22, 24 and/or 25 for providing access to the component 10 may be begin at block 102. At block 104, the coordinate system 19 of the instrument 16 may be calibrated to the target coordinate system 15. At decision box 106, the method 100 may proceed to determine either the location of the component 10 or the location of the closest access panel 22, 24 and/or 25.

When determining the location of the closest access panel, the first step may include determining the maintenance zone (e.g., zone 1 or zone 2 in FIG. 1) in which the component 10 resides, as shown in block 108. Then, as shown in block 110, the potential access panels 22 and 25 in the identified maintenance zone are identified. As shown in decision block 112, if mapping between access panels and components is available (e.g., in a database), then the X, Y, Z data for the panel may be retrieved (block 116) and the method 100 may proceed to the next step (block 118). If no such data is available, the method 100 may proceed to decision block 120.

At decision block 120, the method 100 may determine whether CAD data is available. If CAD data is available, then the method 100 may proceed to block 124. If no CAD data is available, then the method 100 may proceed to block 130.

Figure 9A:
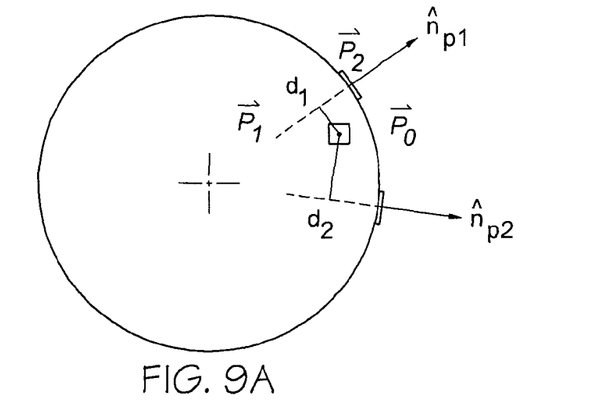
FIGS. 9A, 9B and 9C are explanatory diagrams that may be used with the method shown in FIGS. 8A and 8B to calculate distances to the closest access panels.

As shown in block 124, panel surface normals from CAD models may be used to determine minimum access panel-to-component distance using the following equation:

$$d_1 = \frac{|(\vec{P}_2 - \vec{P}_1) \times (\vec{P}_1 - \vec{P}_0)|}{|\vec{P}_2 - \vec{P}_1|}$$

wherein the variables of this equation are shown in FIG. 9A. Then, as shown in block 126, X, Y, Z data for the identified access panel may be retrieved (block 126) and the method 100 may proceed to the next step (block 128).

Figure 9B:
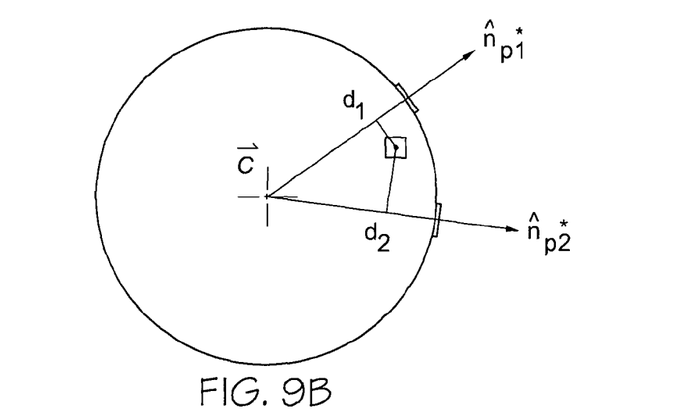
Figure 9C:
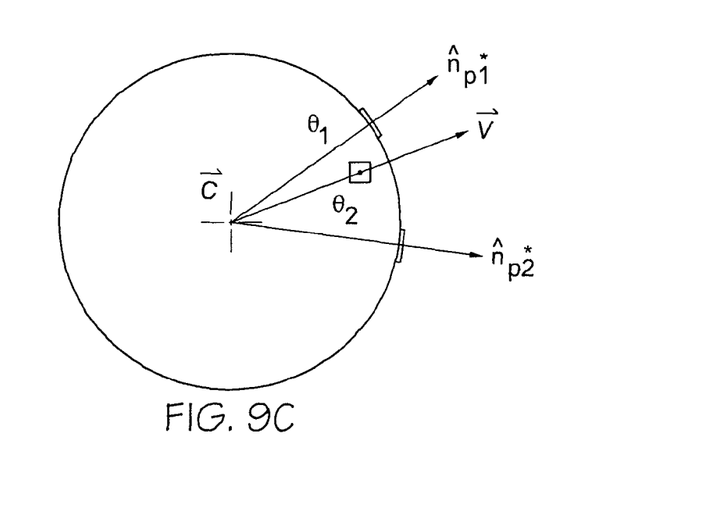

As shown in block 130, panel surface normals may be approximated as vectors from the vehicle centerline C, as shown in FIG. 9B. Then, the minimum access panel-to-component distance may be calculated using the equation provided immediately above or, alternatively, the minimum angle between the vectors can be used to determine the appropriate panel by using the following equation:

$$\theta_i = a \cos(\hat{n}^*_1 \cdot \hat{n}^*_{Pi})$$

wherein the variables of this equation are shown in FIG. 9C. Then, as shown in block 132, X, Y, Z data for the identified access panel may be retrieved (block 132) and the method 100 may proceed to the next step (block 134).

Referring now to FIG. 8B, the direction vector from component 10 or access panel on target object 14 to the instrument 16 may be calculated using target position data, as shown in block 136. Then, as shown in block 138, the inverse calibration matrix may be used to calculate azimuth and elevation angles in the instrument coordinates, and the instrument 16 may be adjusted accordingly (block 140).

Finally, as shown in decision block 142, the method 100 may be repeated (block 146) if there are additional components or access panels. Otherwise, the method 100 may come to an end at block 148.

Several benefits and advantages are derived from one or more or all of the disclosed methods. In one example, using the pointing instrument, such as a pointing instrument which includes a laser wherein the aim point axis is a laser beam of the laser, allows for a faster and more accurate method for locating, for maintenance/repair purposes, a component positioned underneath a surface of a target object, such as an airplane, and/or allows for a faster and more accurate method for locating, for maintenance/repair purposes, an access panel for accessing the component.

The foregoing description of several methods has been presented for purposes of illustration. It is not intended to be exhaustive or to limit the methods to the precise forms and steps disclosed, and obviously many modifications and variations are possible in light of the above teaching. It is intended that the scope of the invention be defined by the claims appended hereto.

What is claimed is:

1. A method for locating a component located underneath a surface of a target object using a pointing instrument having an aim point axis and having an instrument coordinate system, wherein the method comprises:
    a) selecting a component located underneath a surface of the target object, the target object having a target object coordinate system, and the component having a known position in the target object coordinate system;
    b) calculating an inverse calibration matrix which transforms a position defined in the target object coordinate system to a position defined in the instrument coordinate system;
    c) calculating an orientation of the aim point axis of the instrument in the instrument coordinate system for the aim point axis of the instrument to be aligned with the component using at least the inverse calibration matrix, the position of the component in the target object coordinate system, and inverse kinematics of the instrument; and d) rotating the aim point axis of the instrument to the calculated orientation.

2. The method of claim 1, wherein the instrument includes a laser, and wherein the aim point axis is a laser beam of the laser.

3. The method of claim 2, also including activating the laser beam when the aim point axis of the instrument has been rotated to the calculated orientation.

4. The method of claim 3, also including using the laser beam to at least one of trace a contour and trace a fill-in area of the component on the surface when the aim point axis of the instrument is rotated to corresponding aligned points of the component underneath the surface.

5. The method of claim 3, wherein the target object is an airplane, and wherein the known position of the component in the target object coordinate system is obtained from one of a CAD definition or part position database of the component.

6. The method of claim 5, wherein the instrument is located exterior to the airplane, and wherein the surface is an exterior surface of the airplane.

7. The method of claim 5, wherein the instrument is located interior of the airplane, and wherein the surface is an interior surface of the airplane.

8. The method of claim 1, also including determining a depth distance of the component from the surface substantially along the aim point axis when the aim point axis of the instrument has been rotated to the calculated orientation, and displaying the depth distance.

9. A method for locating one of a plurality of access panels for accessing a component located underneath a surface of a target object having a target object coordinate system using a pointing instrument having an aim point axis and having an instrument coordinate system, wherein positions of the component and the access panels in the target object coordinate system are known, wherein the access panels define portions of the surface, and wherein the method comprises:

a) determining a closest access panel to the component using at least the known positions of the component and the access panels in the target object coordinate system;

b) calculating an inverse calibration matrix which transforms a position defined in the target object coordinate system to a position defined in the instrument coordinate system;

c) calculating an orientation of the aim point axis of the instrument in the instrument coordinate system for the aim point axis of the instrument to be aligned with the closest access panel to the component using at least the inverse calibration matrix, the position of the closest access panel to the component in the target object coordinate system, and inverse kinematics of the instrument; and d) rotating the aim point axis of the instrument to the calculated orientation.

10. The method of claim 9, wherein the instrument includes a laser, and wherein the aim point axis is a laser beam of the laser.

11. The method of claim 10, also including activating the laser beam when the aim point axis of the instrument has been rotated to the calculated orientation.

12. The method of claim 11, also including using the laser beam to at least one of trace a contour, trace a fill-in area, and highlight fasteners of the closest access panel to the component on the surface when the aim point axis of the instrument is rotated to corresponding points on the closest access panel to the component.

13. The method of claim 11, wherein the target object is an airplane, wherein the known positions of the component and the access panels in the target object coordinate system are obtained from one of a CAD definitions of the component and the access panels or a database of component and access panel positions, wherein the instrument is located exterior to the airplane, and wherein the surface is an exterior surface of the airplane.

14. The method of claim 11, wherein the target object is an airplane, wherein the positions of the component and the access panels in the target object coordinate system are obtained from one of a CAD definitions of the component and the access panels or a database of component and access panel positions, wherein the instrument is located interior of the airplane, and wherein the surface is an interior surface of the airplane.

15. The method of claim 9, also including determining a substantially perpendicular depth distance of the component from the closest access panel to the component, and displaying the depth distance.

16. A method for locating one of a plurality of access panels for accessing a component located underneath a surface of a target object having a target object coordinate system using a pointing instrument having an aim point axis and having an instrument coordinate system, wherein the access panels define portions of the surface, wherein the target object includes a plurality of separate maintenance zones each having a volume boundary, wherein the component is located in one of the maintenance zones, wherein positions of the component, the access panels, and the volume boundaries of the maintenance zones in the target object coordinate system are known, and wherein the method comprises:

a) identifying the maintenance zone in which the component is located using at least the known positions of the component and the volume boundaries of the maintenance zones in the target object coordinate system;

b) determining within the identified maintenance zone the access panel which is closest to the component using at least the known positions of the component and each access panel in the identified maintenance zone in the target object coordinate system;

c) calculating an inverse calibration matrix which transforms a position defined in the target object coordinate system to a position defined in the instrument coordinate system;

d) calculating an orientation of the aim point axis of the instrument in the instrument coordinate system for the aim point axis of the instrument to be aligned with the determined access panel using at least the inverse calibration matrix, the position of the determined access panel in the target object coordinate system, and inverse kinematics of the instrument; and e) rotating the aim point axis of the instrument to the calculated orientation.

17. The method of claim 16, wherein the instrument includes a laser, and wherein the aim point axis is a laser beam of the laser.

18. The method of claim 17, also including activating the laser beam when the aim point axis of the instrument has been rotated to the calculated orientation.

19. The method of claim 18, also including using the laser beam to at least one of trace a contour, trace a fill-in area, and highlight fasteners of the determined access panel on the surface when the aim point axis of the instrument is rotated to corresponding points on the determined access panel.

20. The method of claim 18, wherein the target object is an airplane, wherein the known positions of the component, the access panels, and the volume boundaries of the maintenance zones in the target object coordinate system are obtained from one of CAD or database definitions of the component, the access panels, and the volume boundaries of the maintenance zones.

* * * * *